Patented May 21, 1929.

1,713,569

UNITED STATES PATENT OFFICE.

JOHN M. TINKER AND IVAN GUBELMANN, OF SOUTH MILWAUKEE, WISCONSIN, ASSIGNORS TO THE NEWPORT COMPANY, OF CARROLLVILLE, WISCONSIN, A CORPORATION OF DELAWARE.

PROCESS OF PRODUCING ORTHO-ACYL-BENZOIC ACID COMPOUNDS.

No Drawing. Application filed April 2, 1928. Serial No. 266,869.

This invention relates to the production of ortho acyl benzoic acid compounds by the condensation, in the presence of aluminum chloride, of phthalic anhydride with benzene or a substituted benzene. The invention has reference more particularly to a method of treating the reaction mass resulting from said condensation, whereby the decomposition of the organic aluminum compound, the recovery of the solvent and the removal of the inorganic aluminum compound may be effected in a simpler and more economical manner than has been done heretofore.

For the manufacture of ortho benzoyl benzoic acids, it has been proposed to decompose the aluminum compound of ortho acyl benzoic acids by digesting the reaction mass with a dilute mineral acid and allowing the diluted and acidified mass to form a two layer system, a lower layer comprising an aqueous solution of aluminum chloride and an upper layer of the ortho acyl benzoic acid dissolved in benzene or a substituted benzene. The two layers are then separated and the solution which formed the upper layer is either heated to remove the benzene by distillation or cooled to cause crystallization of the ortho acyl benzoic acid.

We have now found that by treating the reaction mass, obtained by the condensation of phthalic anhydride with a benzenoid compound, in a different manner and under different conditions, certain advantages with respect to economy of materials and adaptability to plant operation result.

According to our procedure, the condensation mass is run by gravity into ice and water. The diluted condensation mass is maintained at a sufficiently low temperature, say below 40° C., to prevent substantial solution of the ortho acyl benzoic acid compound in the excess solvent, whereby a three layer system instead of a two layer system is formed.

Since the removal of the aluminum in the form of its inorganic salt is carried out at relatively low temperatures, there is less loss of the solvent and a lower fire risk. Likewise the washing out of the aluminum salts in the cold with dilute acid permits the use of very inexpensive wooden apparatus, the upkeep on which has proven to be very low as compared to that on apparatus required by former processes, wherein acids of the strengths recommended and temperature necessary to form a two layer system necessitate more complicated apparatus and a substantially greater expense in upkeep.

Our preferred procedure is as follows: The finished condensation mass comprising the aluminum compound of the ortho benzoyl benzoic acid, or of the orthobenzoyl benzoic acid derivative, a large excess of solvent, such as benzene toluene, chloro benzene or the like is charged into ice and water, sufficient ice being used to keep the temperature of the final mixture at about 25° C. or below. By working in this manner, there is formed at once upon settling a three layer system. A mineral acid, such as hydrochloric or sulfuric, but preferably hydrochloric acid, is now added to fix the aluminum in the form of a mineral salt.

The relative position of the three layers will depend upon which of the benzoyl benzoic acids is being prepared. For instance, in the case of orthobenzoyl benzoic acid, the relative position of the three layers is as follows: the lower layer is an aqueous solution of the aluminum salt of the mineral acid, the middle layer comprises the precipitated ortho berizoyl benzoic acid in a fluffy form, and the upper layer comprises the excess benzene.

In the case of p'-chloro ortho benzoyl benzoic acid, the lower layer will be the chloro benzene, the middle layer comprises the precipitated p'-chloro ortho benzoyl benzoic acid and the upper layer comprises the aqueous solution of the aluminum salt of the mineral acid.

In most cases the middle layer comprises the precipitated acyl benzoic acid which is present therein for the most part, the remainder being dissolved in the benzenoid solvent.

The aqueous aluminum salt layer whether it is on top, as in the case of p'-chloro ortho benzoyl benzoic acid, or on the bottom as in the case of ortho benzoyl benzoic acid, is separated by decantation, or simply drawing off. The two layer system remaining is then washed with water until practically all of the inorganic aluminum salts are removed. The two layer system comprising the ortho benzoyl benzoic acid and the benzenoid compound, is then made alkaline by the addition of caustic soda or caustic potash solution and the excess of benzenoid compound removed by steam distilling. The removal of the solvent can be made complete for all practical purposes, thereby differing from previously disclosed methods. The alkali solution of the respective benzoyl benzoic acid is then filtered to remove practically the last traces of aluminum, dirt and particles of wood, and may be used as such in the preparation of other products or may be evaporated to any desired strength, even to dryness for certain uses. It can likewise, if desired, be treated for the isolation of the free acid as previously described.

Without limiting our invention to any particular procedure, the following examples, in which parts by weight are given, will serve to illustrate preferred forms of our method.

*Example 1. Ortho benzoyl benzoic acid.*

700 parts of dry benzene, 100 parts of phthalic anhydride and 200 parts of anhydrous aluminum chloride are charged into a kettle provided with an agitator, and cooling and heating equipment. The temperature is raised to 75 to 80° C. and held within this range for 3 hours. The condensation mass is then cooled to 40° C. and run out as a fluid mass onto about 1000 parts of ice. Additional ice is added if necessary to keep the temperature below 25° C. 50 parts of hydrochloric acid (100%) in the form of a 10 to 20% solution is then added and the mass stirred for about one hour. The agitator is now stopped and the mass settled. There results a separation into three distinct layers. The aqueous aluminum chloride solution is siphoned from the bottom. The two layer system comprising the ortho benzoyl benzoic acid and the benzene, is then washed with about 1000 parts of water and the wash water likewise siphoned off, whereby practically all of the aluminum is separated from the ortho benzoyl benzoic acid compound.

The ortho benzoyl benzoic acid and benzene are then run into a still which has previously been charged with a solution containing 50 parts of 100% caustic soda. The benzene is removed by steam distilling from the alkaline mass. The residual alkaline solution of ortho benzoyl benzoic acid is then filtered to remove the final traces of aluminum compounds, dirt and wood. This filtered solution is acidified with sulfuric acid, whereupon free ortho benzoyl benzoic acid separates and is filtered off.

*Example 2. P'-chloro ortho benzoyl benzoic acid.*

700 parts of dry chloro benzene, 100 parts of phthalic anhydride and 200 parts of aluminum chloride are charged into a kettle equipped with an agitator and heating and cooling means, and the condensation completed by heating to 100° C. The condensation mass is cooled to 60° C. and charged into about 1000 parts of ice. More ice is added if necessary to keep the final temperature of the mixture below 25° C. There are then added 50 parts of 100% hydrochloric acid in the form of a 10 to 20% solution and the mass is stirred for about one hour. The mass is then allowed to settle, whereby it separates into three distinct layers. The aqueous aluminum chloride is siphoned from the top. The two layer system comprising the p'-chloro ortho benzoyl benzoic acid and chloro benzene, is further washed with water, as above, to remove practically all of the aluminum chloride.

The residual two layer system is charged into a still containing a dilute solution of potassium hydroxide, sufficient for fixing the acids present and precipitating the remaining aluminum salts. The chloro benzene is removed by steam distilling. The residual portion in the still is filtered to remove practically the final traces of aluminum compounds, dirt and wood. The filtered solution containing the potassium salt of p'-chloro ortho benzoyl benzoic acid may be used as such or may be evaporated to dryness.

It will be appreciated by those skilled in the art that our improvements reside in the general procedure which enables us to employ simpler apparatus than heretofore employed. By carrying out the decomposition and removal of aluminum salts at sufficiently low temperatures, the loss of solvent is considerably minimized, as is likewise the fire hazard. By steam distilling off the benzene, or benzene derivative, from an alkaline mass, no trouble is experienced from the corrosive effect of acids, and iron equipment may be used for this step. Moreover, the benzenoid compound may be separated practically completely from the benzoyl benzoic acid compound.

The term ortho acyl benzoic acid as used herein and in the claims is intended to cover ortho benzoyl benzoic acid and its halogen and alkyl derivatives or substitution products. Likewise, the term benzenoid compound is used to designate generically benzene and its halogen and alkyl substitution products.

It should also be noted that the use of the alkali salts of ortho benzoyl benzoic acids in aqueous solution directly, or in a dry state for the preparation of intermediates eliminates the step of isolating the free acids of this series by acidification and the steps of drying and milling bulky products.

We are aware of the fact that numerous details of the process may be varied through a wide range without departing from the principles of this invention. For instance, the addition of acid to the diluted mass is optional, since a large proportion of the aluminum may be removed without the addition of acid, and the remainder removed by the subsequent alkali treatment followed by filtration. Similarly the ortho benzoyl benzoic acid or its derivatives may be isolated from the benzenoid solvent without neutralization to effect a known purification. We therefore, do not purpose limiting the patent granted hereon otherwise than necessitated by the prior art.

We claim as our invention:

1. The process of producing an aromatic acyl-benzoic acid from the reaction mass resulting from the condensation of phthalic anhydride with a benzenoid compound in the presence of aluminum chloride, and containing an organic aluminum compound and an excess of said benzenoid compound, which comprises charging the reaction mass into cold water, maintaining the temperatures of the diluted mass below 40° C., allowing said diluted and cooled mass to form a three layer system including an aqueous layer containing most of the aluminum in the form of a mineral salt, separating said aqueous layer and recovering the acyl benzoic acid from the excess of the benzenoid compound.

2. The process of producing an aromatic acyl-benzoic acid from the reaction mass resulting from the condensation of phthalic anhydride with a benzenoid compound in the presence of aluminum chloride and containing an organic aluminum compound and an excess of said benzenoid compound, which comprises charging the reaction mass into cold water, maintaining the temperature of the diluted mass below 40° C., acidifying the diluted and cooled mass with a mineral acid, allowing the acidified mass to form a three layer system including an aqueous layer containing most of the aluminum combined with said mineral acid, separating said aqueous layer and recovering the acyl benzoic acid from the excess of the benzenoid compound.

3. The process of producing an aromatic acyl-bezoic acid from the reaction mass resulting from the condensation of phthalic anhydride with a benzenoid compound in the presence of aluminum chloride and containing an organic aluminum compound and an excess of said benzenoid compound which comprises charging the reaction mass into ice and water, acidifying the diluted and cooled mixture with a mineral acid to decompose the organic aluminum compound, allowing the mixture to form a three layer system, one layer comprising an aqueous solution of an aluminum salt, a second layer comprising the precipitated acyl benzoic acid and the third layer comprising the benzenoid compound, separating the aqueous layer and recovering the acyl benzoic acid from the remaining two layer system.

4. The process of producing an aromatic acyl-benzoic acid from the reaction mass resulting from the condensation of phthalic anhydride with a benzenoid compound in the presence of aluminum chloride and containing an organic aluminum compound and an excess of said benzenoid compound, which comprises charging the reaction mass into ice and water, acidifying the mixture with a mineral acid to decompose the organic aluminum compound, allowing the mixture to form a three layer system, one layer comprising an aqueous solution of an aluminum salt, a second layer comprising the precipitated acyl benzoic acid and the third layer comprising the benzenoid compound, separating the aqueous layer, making the remaining two layer system alkaline and steam distilling off the benzenoid compound.

5. The process of producing an aromatic acyl-benzoic acid from the reaction mass resulting from the condensation of phthalic anhydride with a benzenoid compound in the presence of aluminum chloride and containing an organic aluminum compound and an excess of said benzenoid compound, which comprises charging the reaction mass into ice and water, keeping the temperature of the mixture about 25° C., acidifying the mixture with a hydrochloric acid to decompose the organic aluminum compound, allowing the mixture to form a three layer system, one layer comprising an aqueous solution of an aluminum chloride, a second layer comprising the precipitated acyl benzoic acid and the third layer comprising the benzenoid compound separating the aqueous layer, making the remaining two layer system alkaline and steam distilling off the benzenoid compound.

6. The process of producing p'-chloro ortho benzoyl benzoic acid from the reaction mass resulting from the condensation of phthalic anhydride with chloro benzene in the presence of aluminum chloride and containing an organic aluminum compound and an excess of chloro benzene, which comprises charging said reaction mass into cold water, acidifying the cooled and diluted mass with a mineral acid, maintaining the temperature of the diluted mass below 40° C., allowing said diluted mass to form a three layer system including an upper aqueous layer containing most of the aluminum in the form of a mineral salt, separating said aqueous layer and recovering the p'-chloro ortho benzoyl benzoic acid from the excess of chloro benzene.

7. The process of producing p'-chloro ortho benzoyl benzoic acid from the reaction mass resulting from the condensation of phthalic anhydride with chloro benzene in the presence of aluminum chloride and containing an organic aluminum compound and an excess of chloro benzene, which comprises charging said reaction mass into cold water, acidifying the cooled and diluted mass with hydrochloric acid, maintaining the temperature of the diluted mass around 25° C., allowing said diluted mass to form a three layer system including an upper aqueous layer containing most of the aluminum in the form of aluminum chloride, separating said aqueous layer and recovering the p'-chloro ortho benzoyl benzoic acid from the excess of chloro benzene.

8. The process of producing p'-chloro ortho benzoyl benzoic acid from the reaction mass resulting from the condensation of phthalic anhydride with chloro benzene in the presence of aluminum chloride and containing an organic aluminum compound and an excess of chloro benzene, which comprises charging said reaction mass into cold water, acidifying the cooled and diluted mass with a mineral acid, maintaining the temperature of the diluted mass below 40° C., allowing said diluted mass to form a three layer system including an upper aqueous layer containing most of the aluminum in the form of a mineral salt, making the remaining two layer system alkaline and steam distilling therefrom the chloro benzene to recover p'-chloro ortho benzoyl benzoic acid in the form of its alkali salt.

9. The process of producing p'-chloro ortho benzoyl benzoic acid from the reaction mass resulting from the condensation of phthalic anhydride with chloro benzine in the presence of aluminum chloride and containing an organic aluminum compound and an excess of chloro benzene, which comprises charging said reaction mass into cold water, acidifying the cooled and diluted mass with a mineral acid, maintaining the temperature of the diluted mass below 40° C., allowing said diluted mass to form a three layer system including an upper aqueous layer containing most of the aluminum in the form of a mineral salt, making the remaining two layer system alkaline, steam distilling therefrom the chloro benzene, filtering the undistilled portion, and evaporating to dryness to recover p'-chloro ortho benzoyl benzoic acid in the form of its alkali salt.

10. The process of producing an aromatic acyl-benzoic acid from the reaction mass resulting from the condensation of phthalic anhydride with a benzenoid compound in the presence of aluminum chloride and containing an organic aluminum compound and an excess of said benzenoid compound, which comprises charging the reaction mass into ice and water, acidifying the mixture with a mineral acid to decompose the organic aluminum compound, allowing the mixture to form a three layer system, one layer comprising an aqueous solution of an aluminum salt, a second layer comprising the precipitated acyl benzoic acid and the third layer comprising the benzenoid compound, separating the aqueous layer, making the remaining two layer system alkaline, steam distilling off the benzenoid compound, filtering undistilled portion, and evaporating to dryness to recover the acyl-benzoic acid in the form of its alkali salt.

In testimony whereof we have hereunto subscribed our names at Carrollville, Milwaukee County, Wisconsin.

JOHN M. TINKER.
IVAN GUBELMANN.